(12) United States Patent
Zalme

(10) Patent No.: US 10,986,941 B2
(45) Date of Patent: Apr. 27, 2021

(54) INTERCHANGEABLE FASTENER SYSTEM

(71) Applicant: Mark Zalme, Fletcher, NC (US)

(72) Inventor: Mark Zalme, Fletcher, NC (US)

( * ) Notice: Subject to any disclaimer, the term of this patent is extended or adjusted under 35 U.S.C. 154(b) by 106 days.

(21) Appl. No.: 16/511,282

(22) Filed: Jul. 15, 2019

(65) Prior Publication Data

US 2020/0015604 A1 Jan. 16, 2020

Related U.S. Application Data

(60) Provisional application No. 62/697,831, filed on Jul. 13, 2018.

(51) Int. Cl.
*A47F 5/08* (2006.01)
*F16B 19/10* (2006.01)

(52) U.S. Cl.
CPC ........ *A47F 5/0823* (2013.01); *F16B 19/1081* (2013.01)

(58) Field of Classification Search
CPC .. A47F 5/0823; A47F 5/0815; F16B 19/1081; F16M 13/02; F16M 13/022; H01R 13/625
USPC .............. 248/220.21, 222.52, 224.8, 220.31
See application file for complete search history.

(56) References Cited

U.S. PATENT DOCUMENTS

| | | | | |
|---|---|---|---|---|
| 4,527,760 A | * | 7/1985 | Salacuse | A47K 1/09 24/DIG. 53 |
| 8,439,209 B2 | * | 5/2013 | Strollo | A47B 81/00 211/75 |
| D867,121 S | * | 11/2019 | Zalme | F16B 45/00 D8/394 |
| 2005/0051678 A1 | * | 3/2005 | Modesto | A47F 5/0884 248/121 |
| 2010/0162534 A1 | * | 7/2010 | Kato | F16B 45/00 24/292 |

* cited by examiner

*Primary Examiner* — Anita M King
(74) *Attorney, Agent, or Firm* — William G. Heedy; The Van Winkle Law Firm

(57) ABSTRACT

An interchangeable fastener system for use in combination with a perforated board or other surface on a vertical plane includes a main fastener including a base for supporting the main fastener on the perforated board; the base surrounding a channel defined by an inner surface including opposing ramp surfaces to facilitate tightening of an attachment member, and a mechanical stop adjacent each ramp surface to prevent over rotation of the attachment member; and the attachment member including an elongate member having opposing ends, wherein the elongate member is sized and configured for selective passage through the channel from the front surface through the rear surface and wherein the attachment member may be selectively rotated so that opposing ends of the elongate member are each in engaged abutment against a corresponding one of the opposing ramp surfaces and mechanical stops.

20 Claims, 15 Drawing Sheets

INTERCHANGEABLE FASTENER SYSTEM

RELATED APPLICATION

This is a U.S. non-provisional application relating to and claiming the benefit of U.S. Provisional Patent Application Ser. No. 62/697,831, filed Jul. 13, 2018.

FIELD OF THE INVENTION

This invention relates to an interchangeable fastener system and, more particularly, a system including a main fastener for connecting to a surface on a vertical plane, such as a perforated board wall, and pairing with an interchangeable attachment member.

BACKGROUND OF THE INVENTION

A considerable number of fasteners for use in combination with perforated boards are widely known in the art. Such fasteners are often used for organizing tools and accessories and are most commonly utilized in shops and garages. The large majority of these fasteners are varyingly sized and shaped hooks for hanging tools and accessory items thereon. Such fasteners have a limited scope of potential use.

While there are existing fastener systems, such as the fastener disclosed in U.S. Pat. No. 5,407,160, which include improvements over the prior art and are useful for their intended purposes, these devices fail to provide an adequate solution that addresses the need for a fastener system for use in connection with a broad scope of applications.

Therefore, there exists a need for an interchangeable fastener system including a main fastener and one or more interchangeable attachment members.

SUMMARY OF THE INVENTION

In accordance with one form of the present invention, there is provided an interchangeable fastener system for use in combination with a perforated board having a plurality of openings thereon, the interchangeable fastener system including a main fastener including a base having a rear surface and a front surface; a plurality of protrusions extending from the rear surface of the base, and each of the plurality of protrusions being sized and configured for engaged passage through a corresponding one of the plurality of openings on the perforated board for supporting the main fastener on the perforated board; each of the plurality of protrusions being located on a corresponding perimeter zone of the base, wherein each of the perimeter zones defines a tab; a plurality of slots formed on the base for facilitating selectively breaking off the corresponding tab; the base surrounding a channel defined by an inner surface extending between open ends at the rear and front surfaces of the base, the inner surface including opposing ramp surfaces to facilitate tightening of an attachment member, a mechanical stop adjacent each ramp surface to prevent over rotation of the attachment member, and a latching protrusion sized and configured for preventing inadvertent removal of the attachment member, and wherein the latching protrusion may be selectively depressed to permit removal of the attachment member; the attachment member including an elongate member having opposing ends, wherein the elongate member is sized and configured for selective passage through the channel from the front surface through the rear surface and wherein the attachment member may be selectively rotated so that opposing ends of the elongate member are each in engaged abutment against a corresponding one of the opposing ramp surfaces and mechanical stops; and a cylindrical bore formed on the base, the cylindrical bore being sized and configured for centering the attachment member within the channel.

In accordance with another form of the present invention, there is provided an interchangeable fastener system for use in combination with a perforated board having a plurality of openings thereon, the interchangeable fastener system including a main fastener including a base having a rear surface and a front surface; a plurality of counterbored holes formed on the base, each of the plurality of counterbored holes being relieved for engaged receipt of a corresponding one of a plurality of push grommets, and each of the plurality of grommets being sized and configured for engaged passage through a corresponding one of the plurality of openings on the perforated board for supporting the main fastener on the perforated board; the base surrounding a channel defined by an inner surface extending between open ends at the rear and front surfaces of the base, the inner surface including opposing ramp surfaces to facilitate tightening of an attachment member, and a mechanical stop adjacent each ramp surface to prevent over rotation of the attachment member; the attachment member including an elongate member having opposing ends, wherein the elongate member is sized and configured for selective passage through the channel from the front surface through the rear surface and wherein the attachment member may be selectively rotated so that opposing ends of the elongate member are each in engaged abutment against a corresponding one of the opposing ramp surfaces and mechanical stops; and a cylindrical bore formed on the base, the cylindrical bore being sized and configured for centering the attachment member within the channel.

In accordance with another form of the present invention, there is provided an interchangeable fastener system for use in combination with a perforated board having a plurality of openings thereon, the interchangeable fastener system including a main fastener including a base having a rear surface and a front surface; a plurality of counterbored holes formed on the base, each of the plurality of counterbored holes being relieved for engaged receipt of a corresponding one of a plurality of push grommets, and each of the plurality of grommets being sized and configured for engaged passage through a corresponding one of the plurality of openings on the perforated board for supporting the main fastener on the perforated board; the base surrounding a channel defined by an inner surface extending between open ends at the rear and front surfaces of the base, the inner surface including opposing ramp surfaces to facilitate tightening of an attachment member; the attachment member including an elongate member having opposing ends, wherein the elongate member is sized and configured for selective passage through the channel from the front surface through the rear surface and wherein the attachment member may be selectively rotated until a male detent mates with a female detent for securing the attachment member to the main fastener; and a cylindrical bore formed on the base, the cylindrical bore being sized and configured for centering the attachment member within the channel.

BRIEF DESCRIPTION OF THE DRAWINGS

For a fuller understanding of the nature of the present invention, reference should be made to the following detailed description, taken in conjunction with the accompanying drawings in which.

Like reference numerals refer to like parts throughout the several views of the drawings.

DETAILED DESCRIPTION OF THE PREFERRED EMBODIMENTS

Referring to the several views of the drawings, the interchangeable fastener system 10 of the present invention for use in conjunction with perforated board having a plurality of openings thereon is shown and described herein and is generally indicated as 10.

Figure 1:
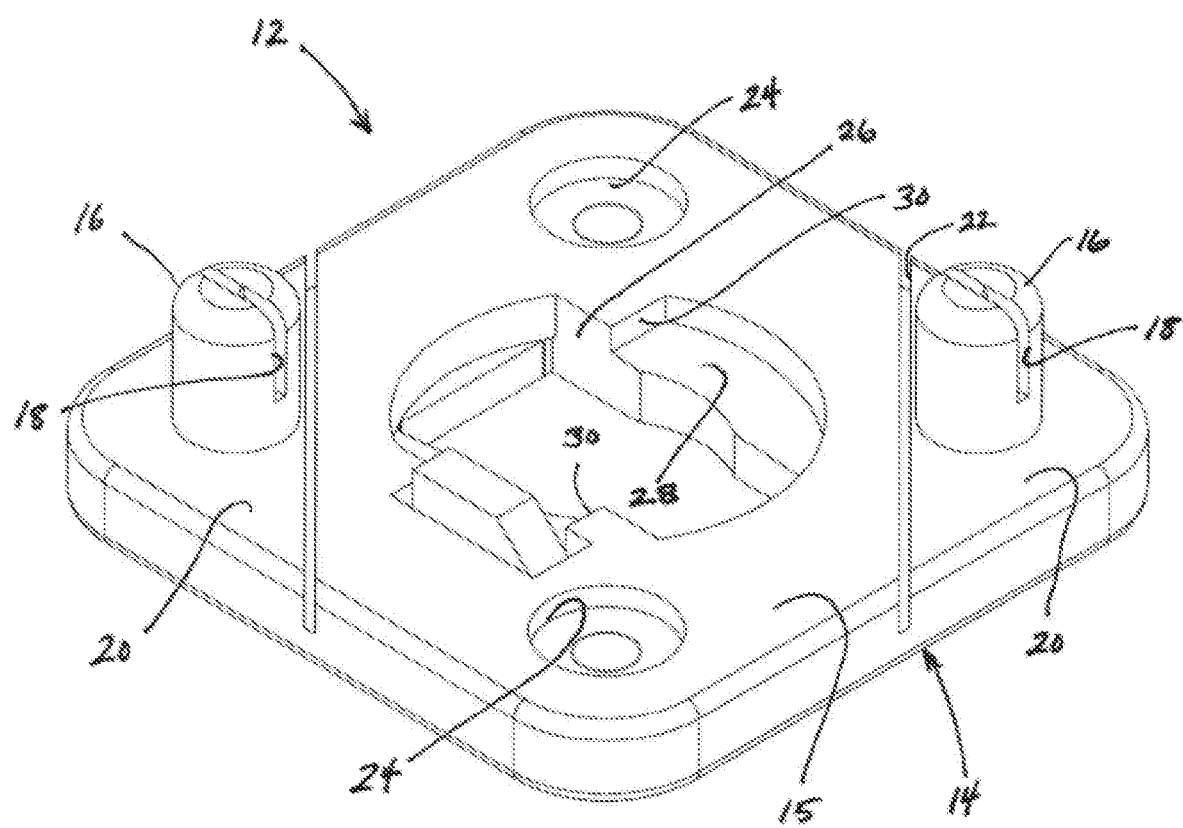
FIG. 1 is a perspective view of a main fastener in accordance with one embodiment.
Figure 2:
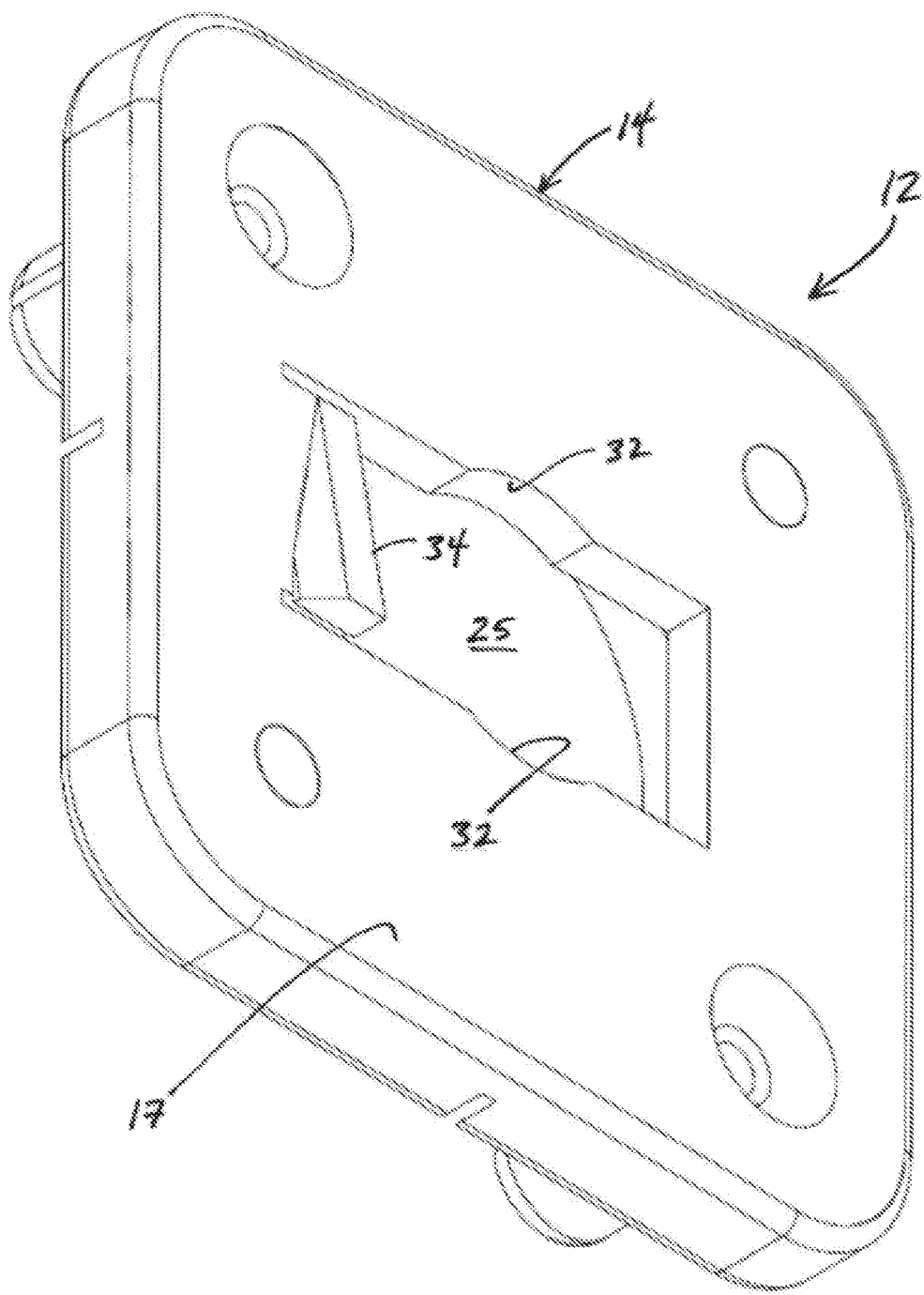
FIG. 2 is a perspective view thereof.
Figure 3:
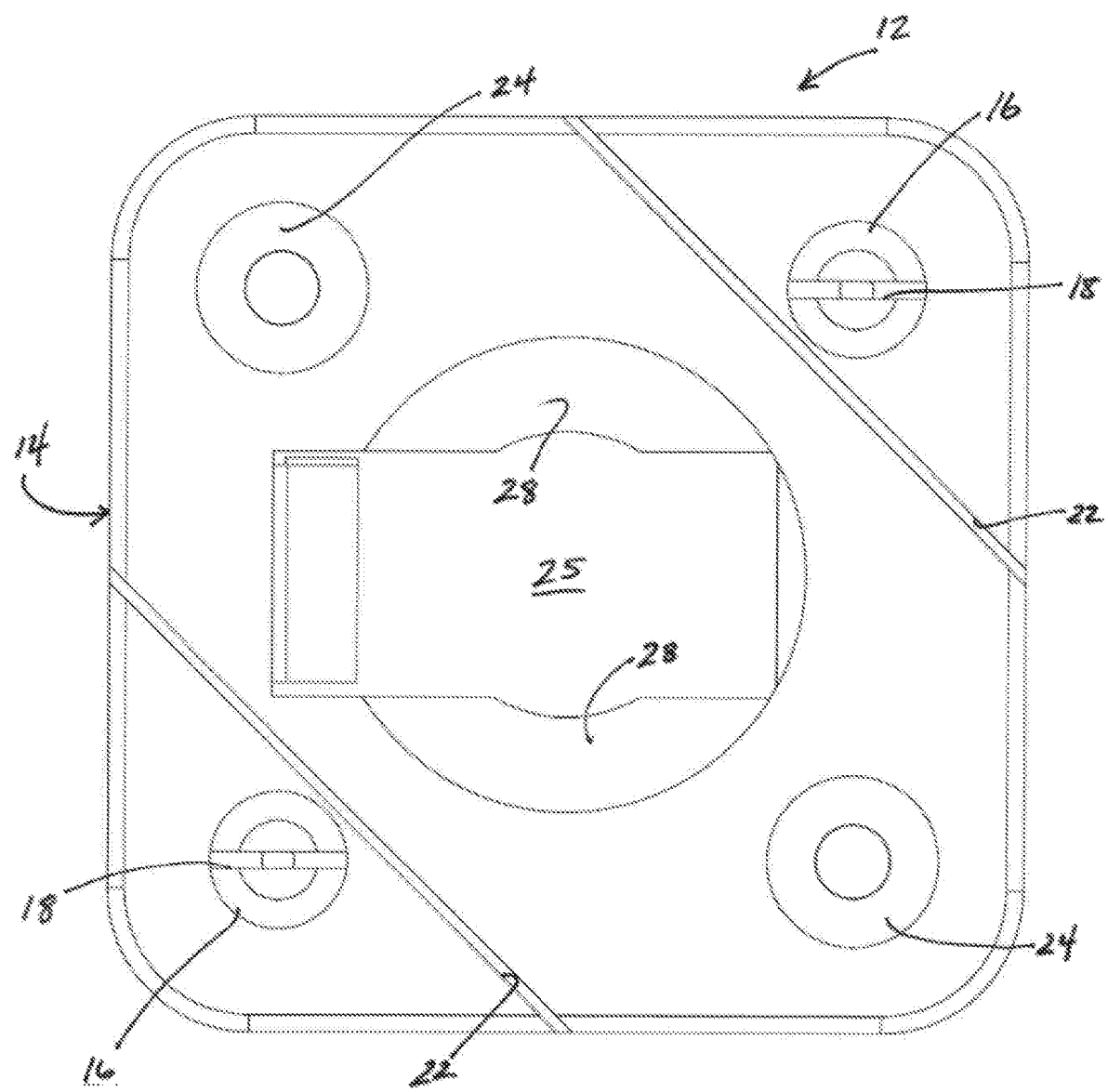
FIG. 3 is a top plan view thereof.
Figure 4:
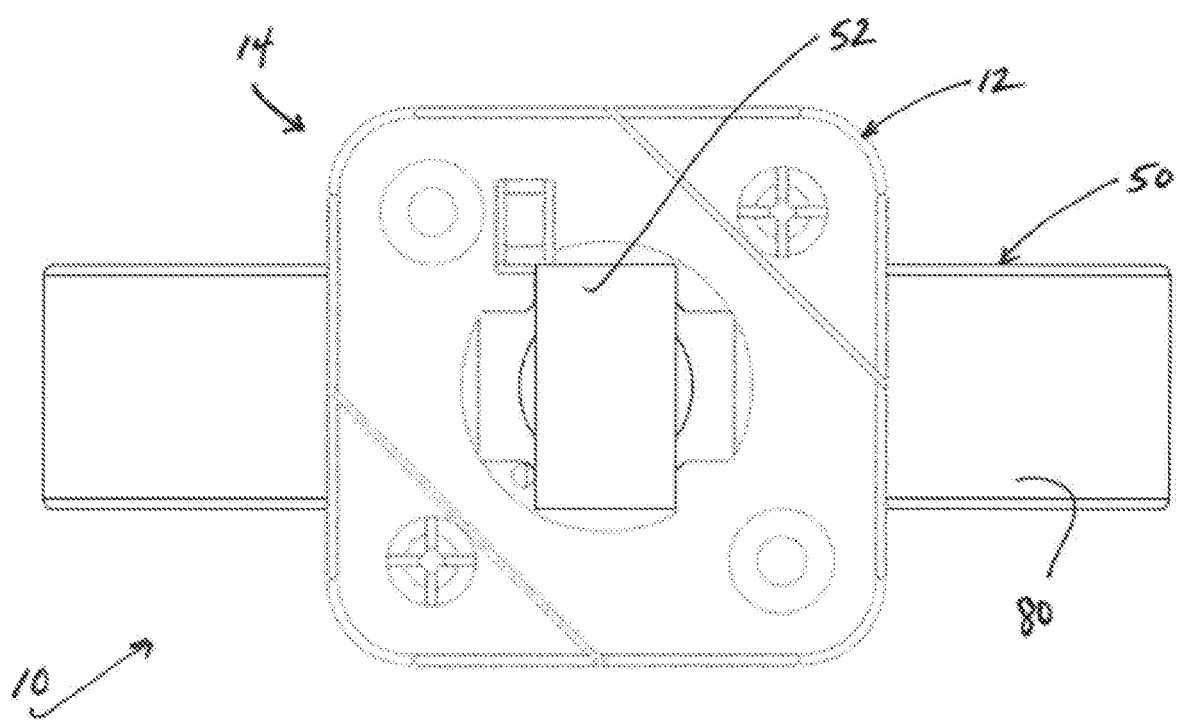
FIG. 4 is a top plan view of the interchangeable fastener system of the present invention in accordance with one embodiment.
Figure 5:
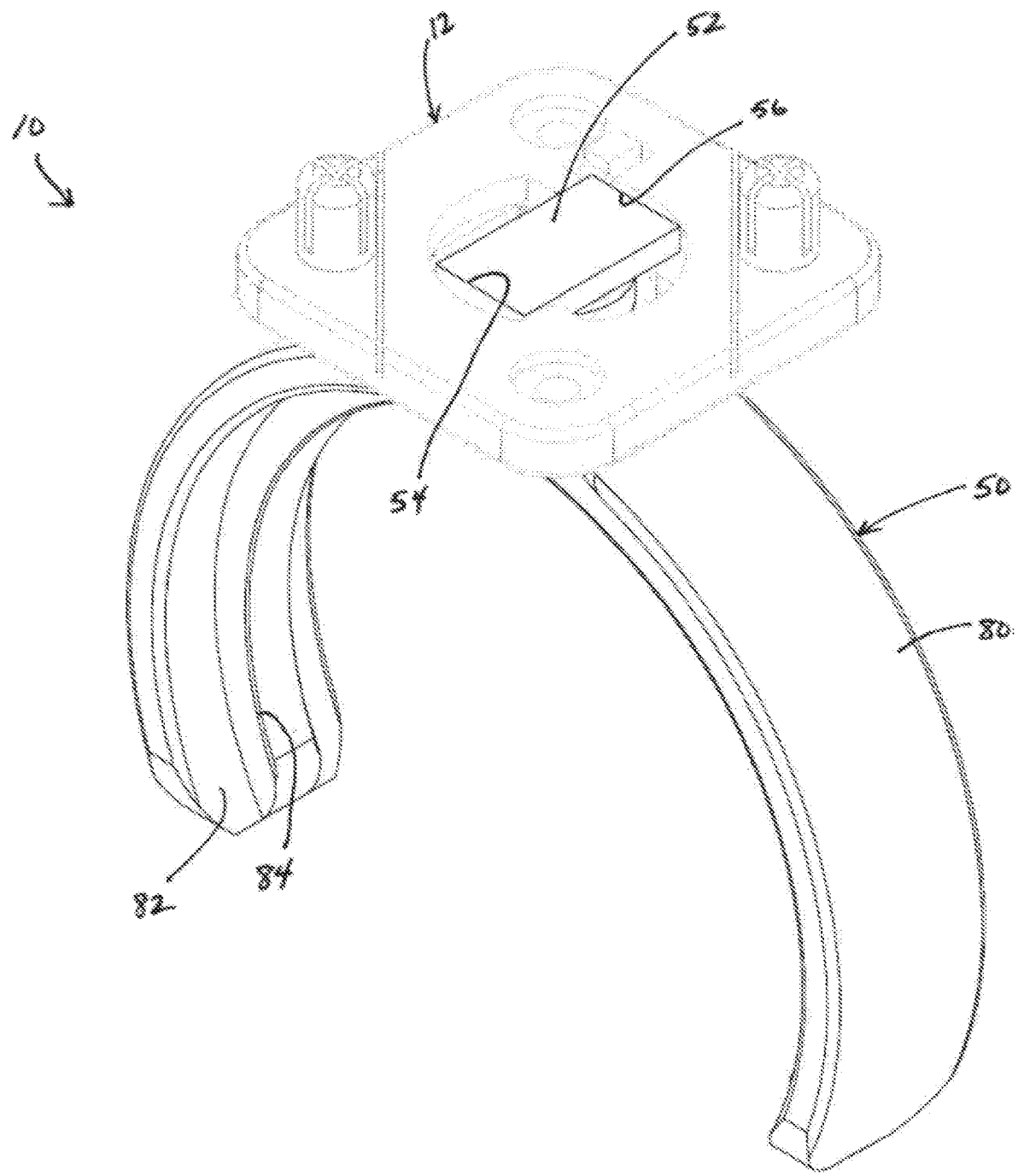
FIG. 5 is a perspective view thereof.
Figure 6:
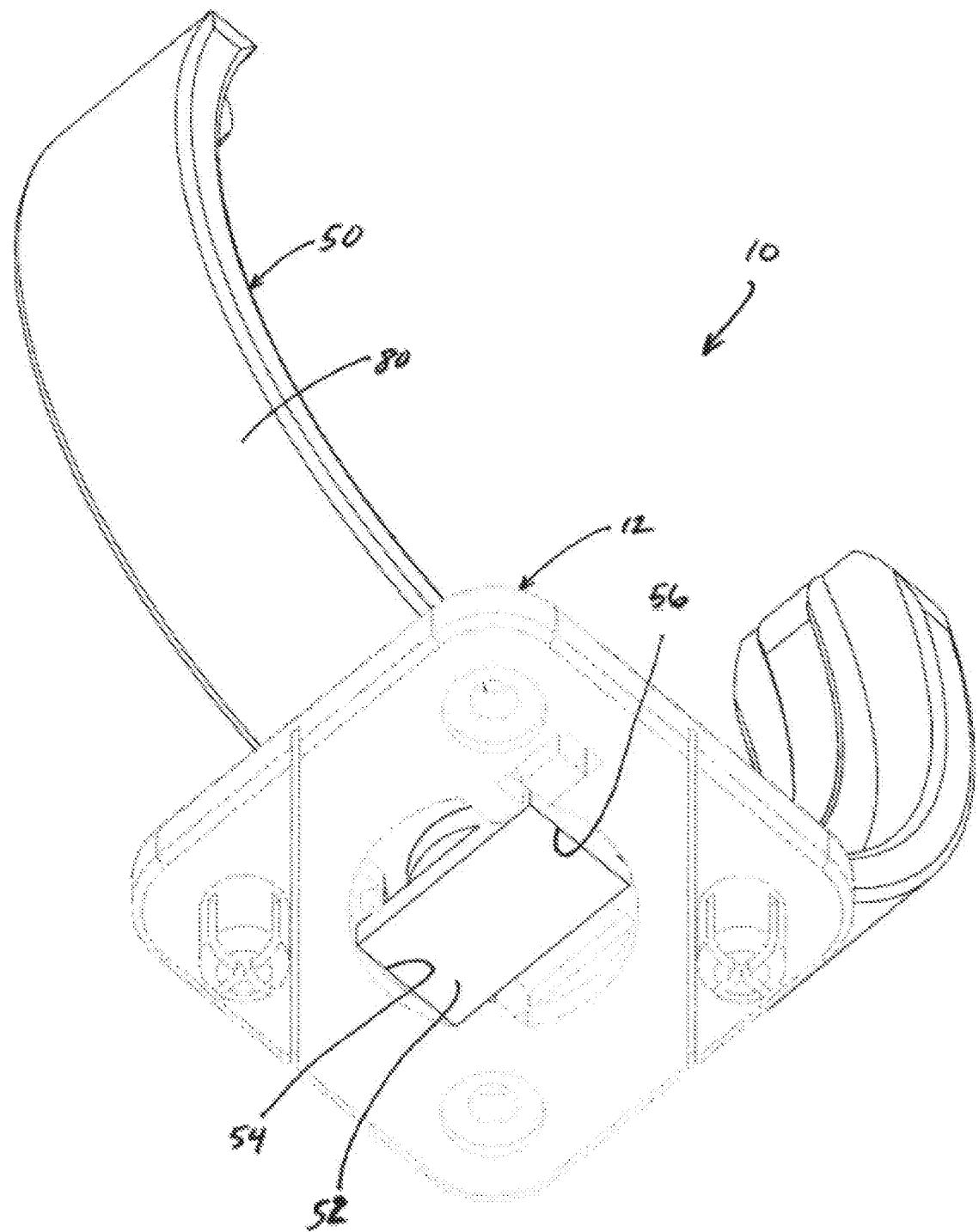
FIG. 6 is a perspective view thereof.
Figure 7:
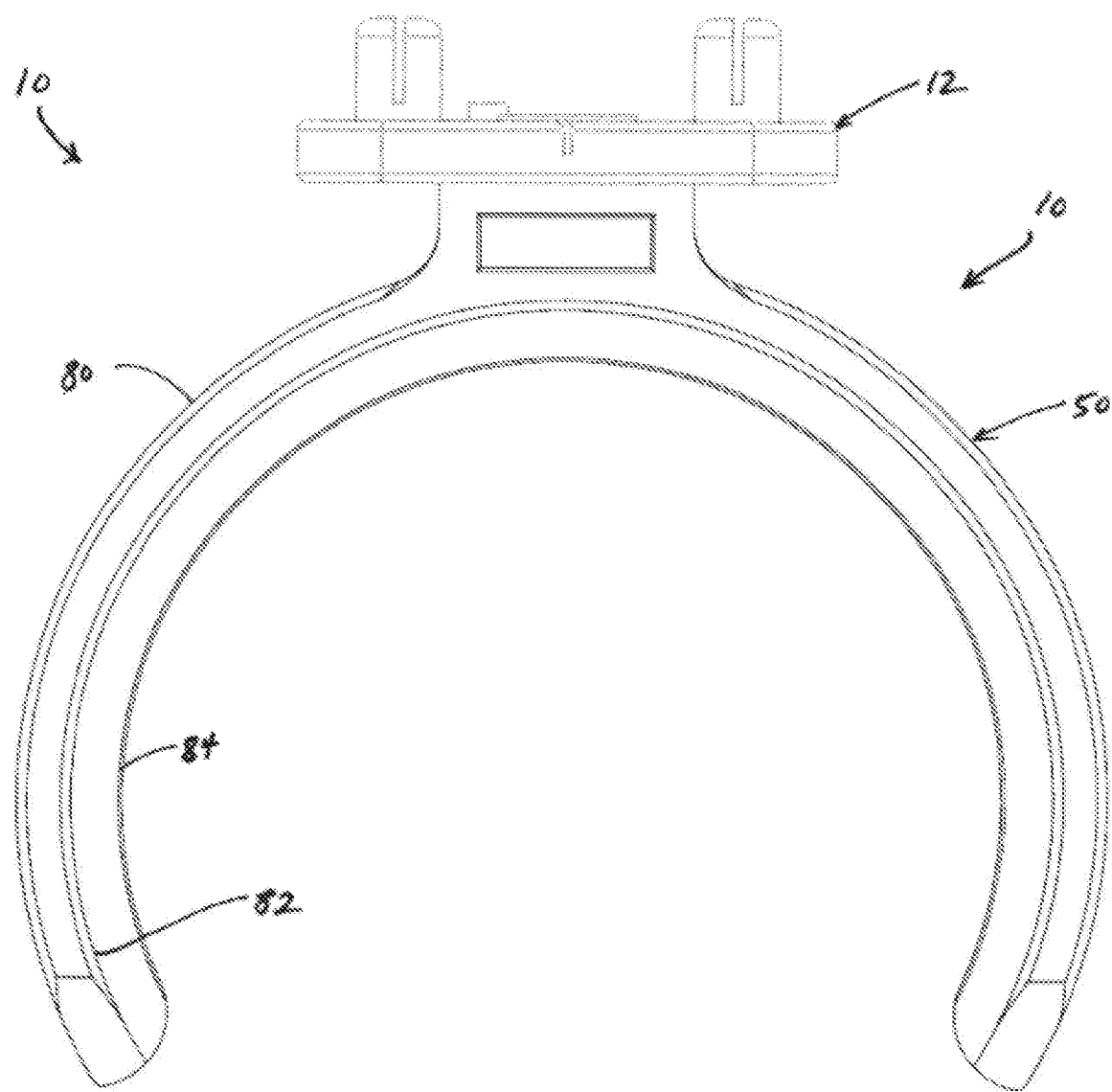
FIG. 7 is a front elevational view thereof.
Figure 8:
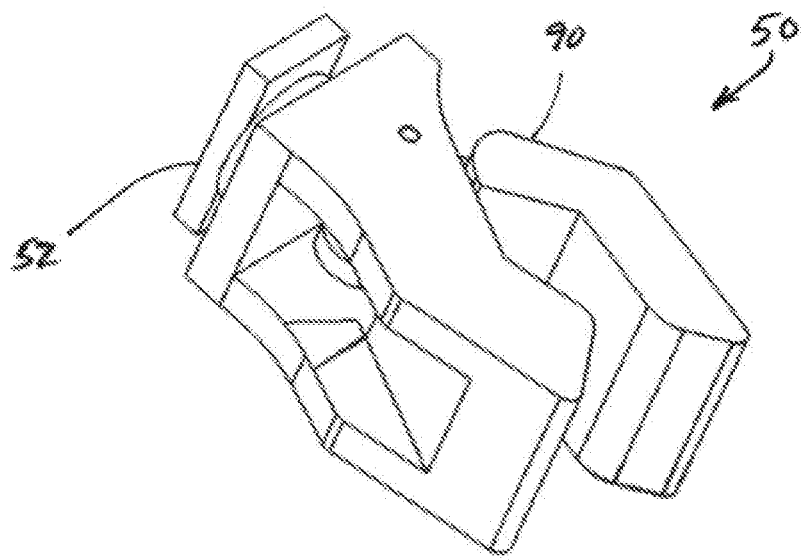
FIG. 8 is a perspective view of a spring clamp member.
Figure 9:
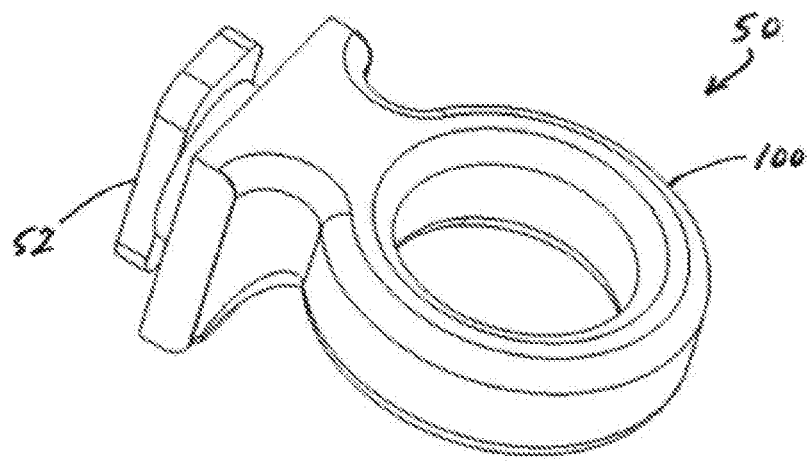
FIG. 9 is a perspective view of a loop member.
Figure 10:
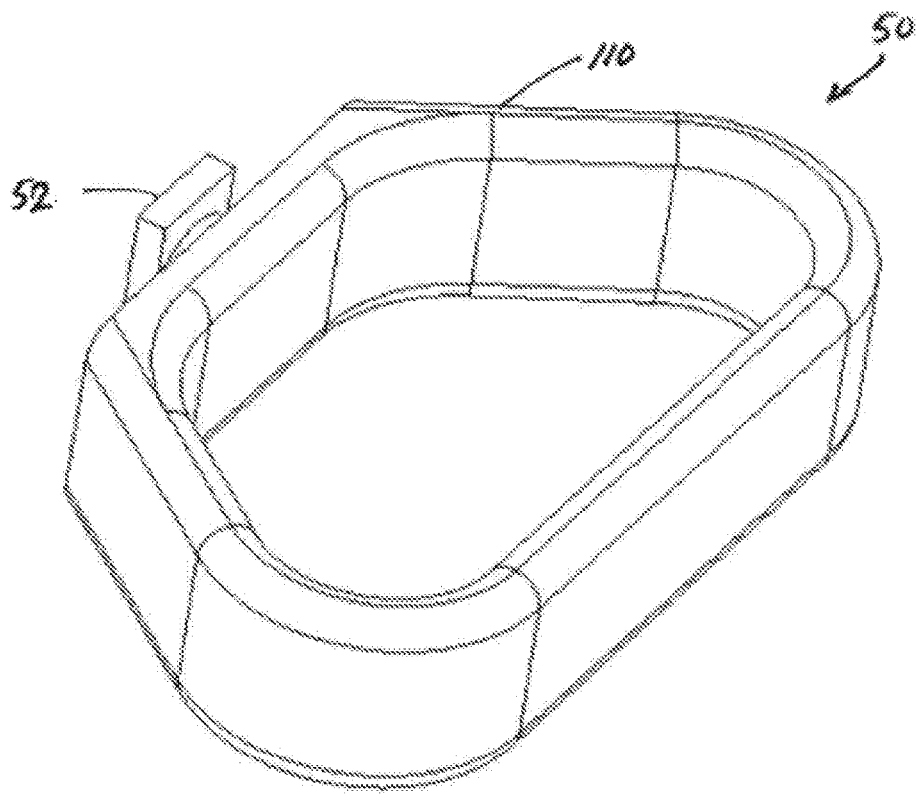
FIG. 10 is a perspective view of a quadrilateral member.
Figure 11:
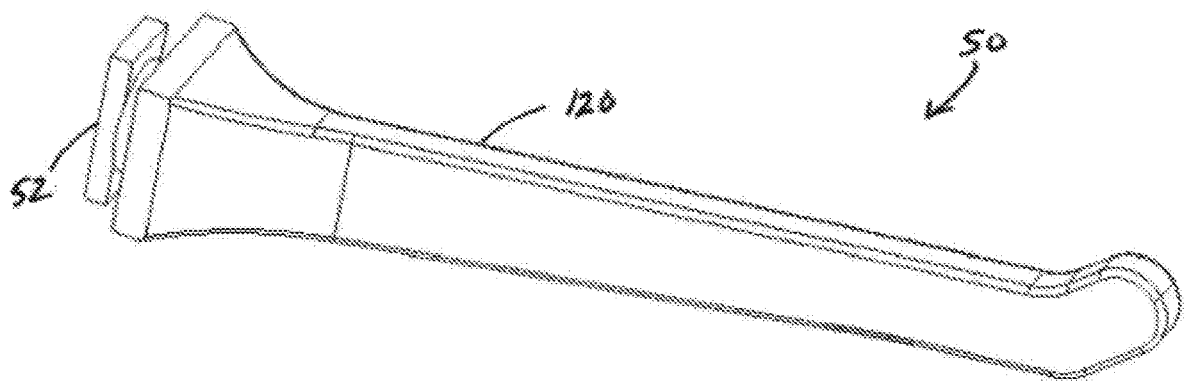
FIG. 11 is a perspective view of a hook member.
Figure 12:
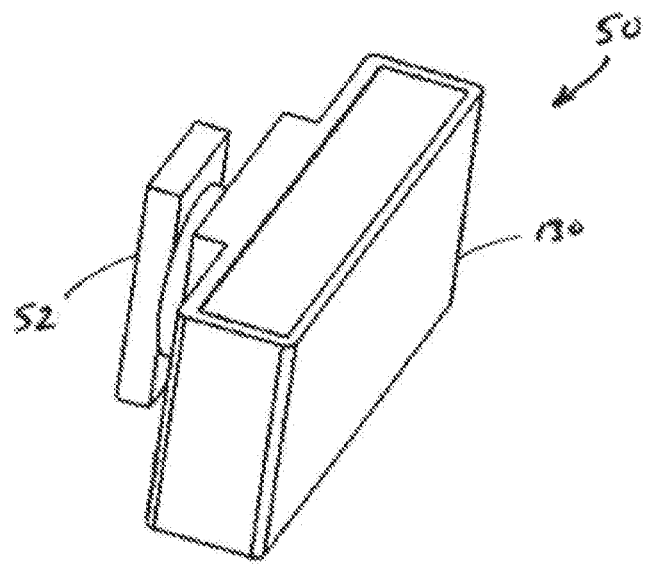
FIG. 12 is a perspective view of a magnetic member.
Figure 13:
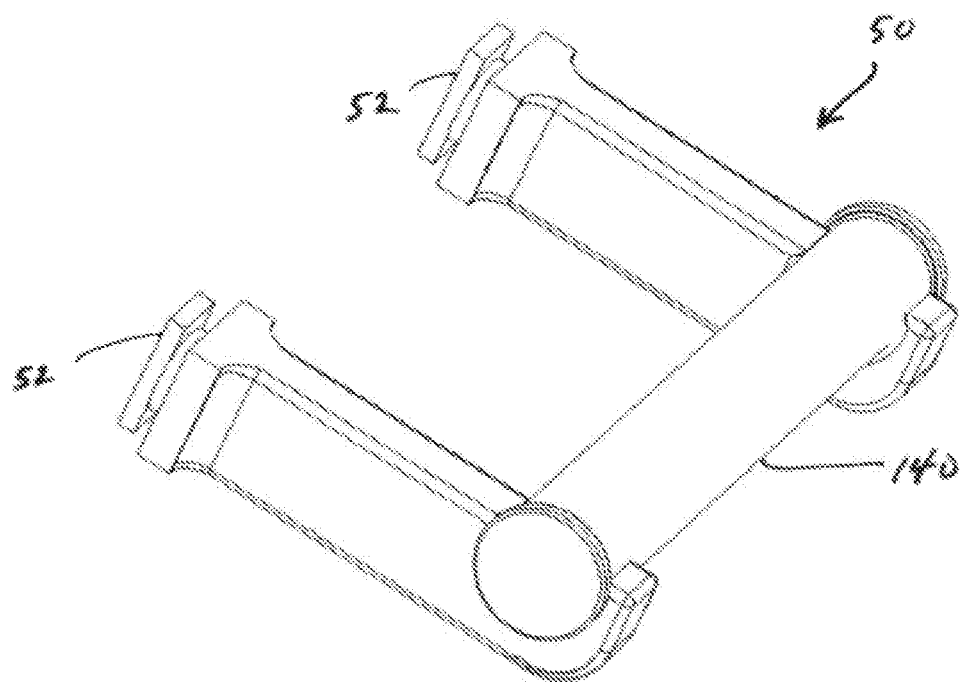
FIG. 13 is a perspective view of a spool holder member.

Referring initially to FIGS. 1-3, the interchangeable fastener system 10 includes a main fastener 12 including a base 14 having a rear surface 15 and a front surface 17. A plurality of protrusions 16 extend from the rear surface of the base 14, wherein each of the plurality of protrusions 16 is sized and configured for engaged passage through a corresponding one of the plurality of openings on the perforated board for supporting the main fastener 12 on the perforated board, which is generally vertically oriented. Each of the plurality of protrusions 16 includes at least one slot 18 to allow for expansion and passage therethrough of a stud for securing the main fastener 12 to the perforated board.

Still generally referring to FIGS. 1-3, each of the plurality of protrusions 16 is located on a perimeter zone of the base 14, the perimeter zone defining a tab 20. First and second slots 22 are formed on the base 14 for facilitating the breaking off of the corresponding tab 20 if needed. At least one counterbore relief 24 is provided and configured to provide clearance for a separate wall anchor, such as a plastic wall anchor, for wall mounting of the main fastener 12. The base 14 surrounds a channel 25 defined by an inner surface 26 extending between open ends at the rear and front surfaces of the base 14, the inner surface 26 including opposing ramp surfaces 28 to facilitate tightening of an attachment member 50 (see FIGS. 4-13). In a preferred embodiment, the opposing ramp surfaces 28 have opposite angles of incline (i.e., one ramp surface 28 is angled upwards towards the rear surface 15 and the other ramp surface 28 is angled upwards towards the front surface 17) for added friction between the elongate member 52 and the inner surface 26. A mechanical stop 30 is included adjacent each opposing ramp surface 28 to prevent over rotation of the attachment member 50.

Referring specifically to FIG. 2, a cylindrical bore 32 may be formed in the base 12 for centering the attachment member 50 within the channel 25. Additionally, a latching protrusion 34 sized and configured for preventing inadvertent removal of the attachment member 50 may be included. The latching protrusion 34 may be selectively depressed to permit removal of the attachment member 50.

Referring now to FIGS. 4-7, the attachment member 50 includes an elongate member 52 having opposing ends 54 and 56, wherein the elongate member 52 is sized and configured for selective passage through the channel 25 from the front surface through the rear surface and wherein the attachment member 50 may be selectively rotated so that opposing ends 54 and 56 of the elongate member 52 are each in engaged abutment against a corresponding one of the opposing ramp surfaces 28 and mechanical stops 30. While the attachment member 50 exemplified in FIGS. 4-7 is a clamp member 80 and additional embodiments of the attachment member 50 are further illustrated in FIGS. 8-13, other nonlimiting embodiments of the attachment member 50 are considered, as well, which are not illustrated herein.

The clamp member 80 is a semi-circular member forming an opening. An interior surface 82 of the clamp member 80 is sized and configured for engaged receipt of a container 300 (see FIG. 17) as the container 300 is passed through the opening of the clamp member 80 and into abutment with the interior surface 82 (i.e., the inner surface 82 of the clamp member 80 grips the container). In one embodiment, the inner surface 82 forms a recessed lip 84 for providing varying depths of grip by the inner surface 82. In one embodiment, the clamp member 80, including the inner surface 82 and recessed lip 84, is symmetrical along its x and y axes.

FIGS. 8-13 illustrate additional embodiments of the attachment member 50, including a spring clamp member 90, a loop member 100, a quadrilateral member 110, a hook member 120, a magnetic member 130, and a spool holder member 140.

Figure 14:
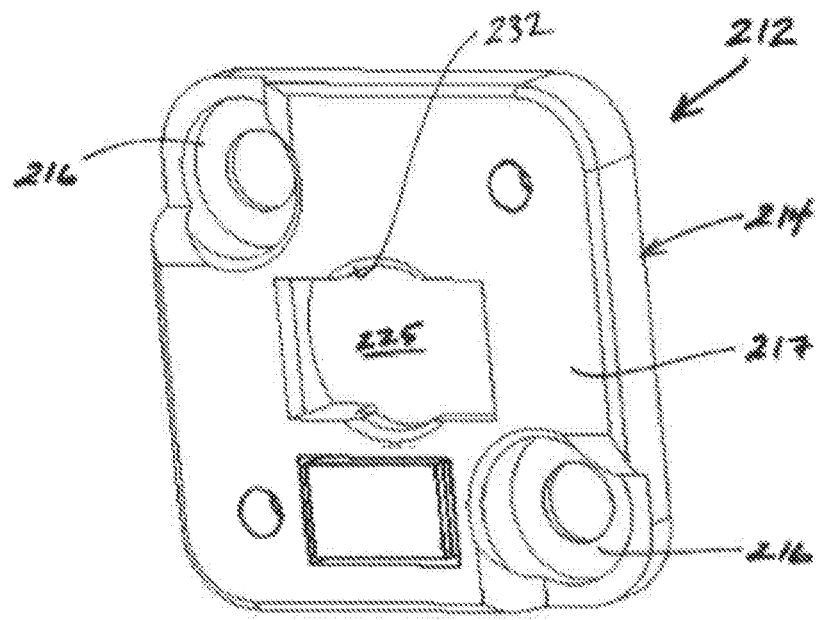
FIG. 14 is a front perspective view of a main fastener in accordance with one embodiment.
Figure 15:
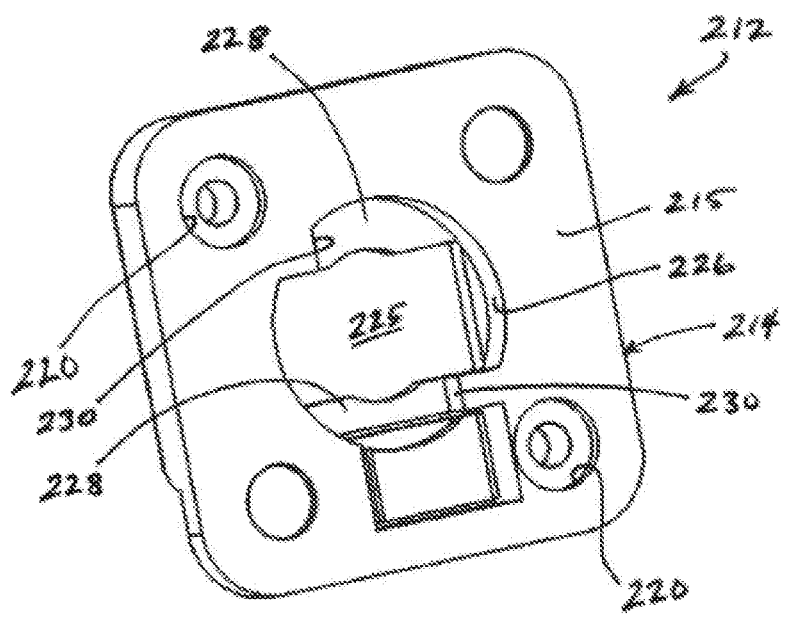
FIG. 15 is a rear perspective view thereof.
Figure 16:
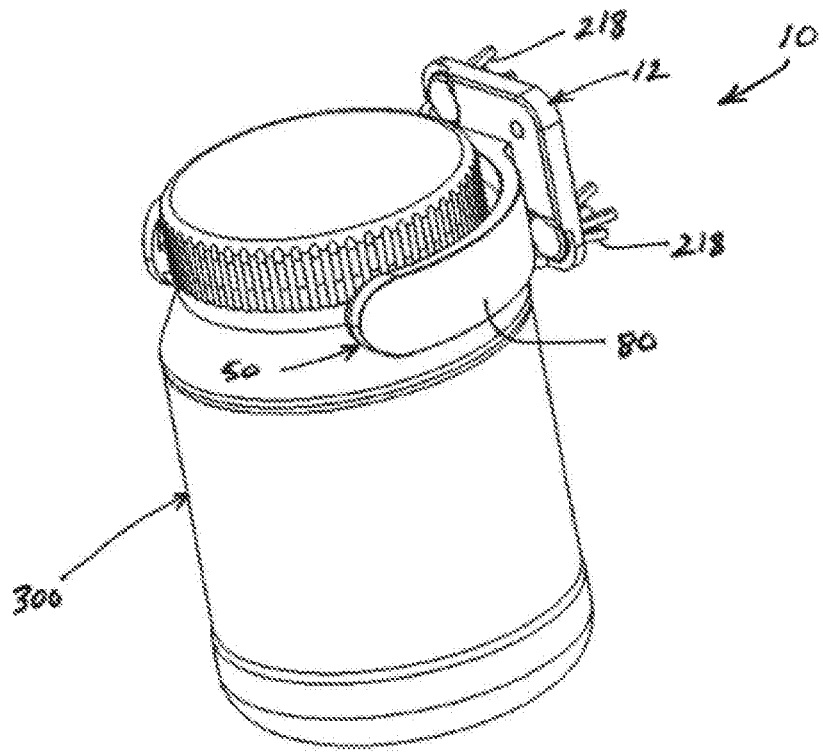
FIG. 16 is a perspective view of the interchangeable fastener system of the present invention in accordance with one embodiment.

Referring now to FIGS. 14-16, a main fastener 212 is shown in accordance with one embodiment for use as part of the interchangeable fastener system 10. The main fastener 212 includes a base 214 having a rear surface 215 and a front surface 217. A plurality of counterbored holes 216 are formed on the main fastener 212, each of the counterbored holes 216 being relieved for receipt of a push grommet 218 for attachment of the main fastener 212 to the perforated board surface. At least one counterbore relief 220 is formed on the main fastener 212, the at least one counterbore relief 220 being configured to provide clearance for a separate wall anchor, such as a plastic wall anchor, for mounting of the main fastener 212 to a vertically oriented surface. The base 214 surrounds a channel 225 defined by an inner surface 226 extending between open ends at the rear and surfaces of the base 14, the inner surface 226 including opposing ramp surfaces 228 to facilitate tightening of an attachment member 50. In a preferred embodiment, the opposing ramp surfaces 228 each opposite angles of incline (i.e., one ramp surface 228 is angled upwards towards the rear surface 215 and the other ramp surface 228 is angled upwards towards the front surface 217) for added friction between the elongate member 52 and the inner surface 226. A mechanical stop 230 is included adjacent each opposing ramp surface 228 to prevent over rotation of the attachment member 50.

A cylindrical bore 232 may be formed in the base 212 for centering the attachment member 250 within the channel 225. In operation, the elongate member 52 is sized and configured for selective passage through the channel 225 from the front surface 217 through the rear surface 215 and wherein the attachment member 50 may be selectively rotated so that opposing ends 54 and 56 of the elongate member 52 are each in engaged abutment against a corresponding one of the opposing ramp surfaces 228 and mechanical stops 230.

Figure 17:
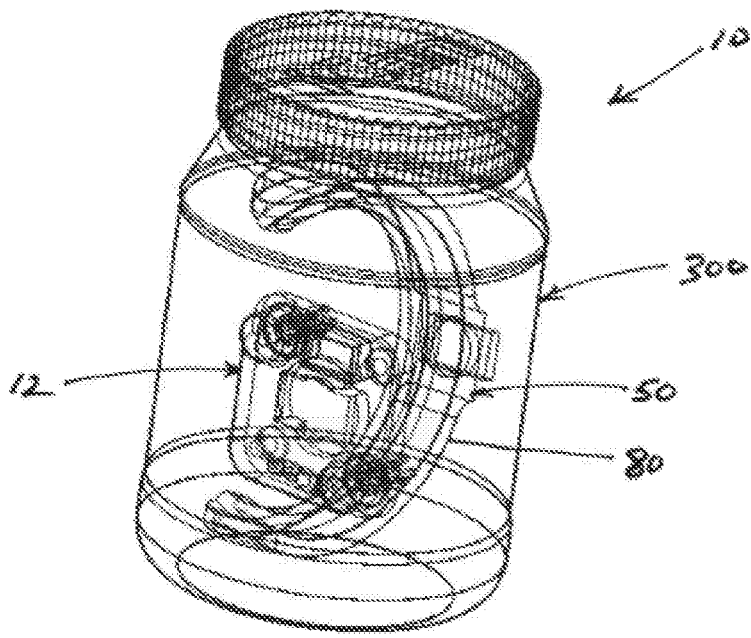
FIG. 17 is a perspective view thereof in the stowed configuration.
Figure 18:
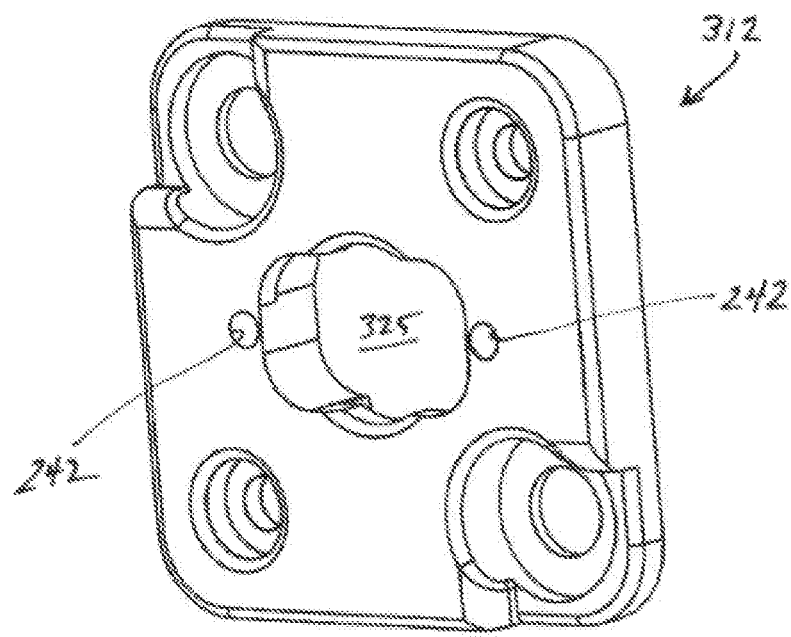
FIG. 18 is a perspective view of a main fastener in accordance with one embodiment.
Figure 19:
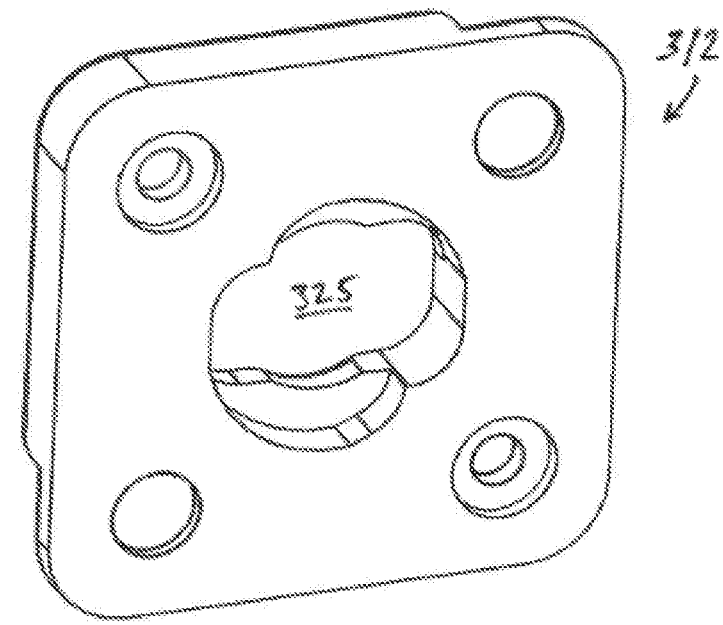
FIG. 19 is a perspective view thereof.
Figure 20:
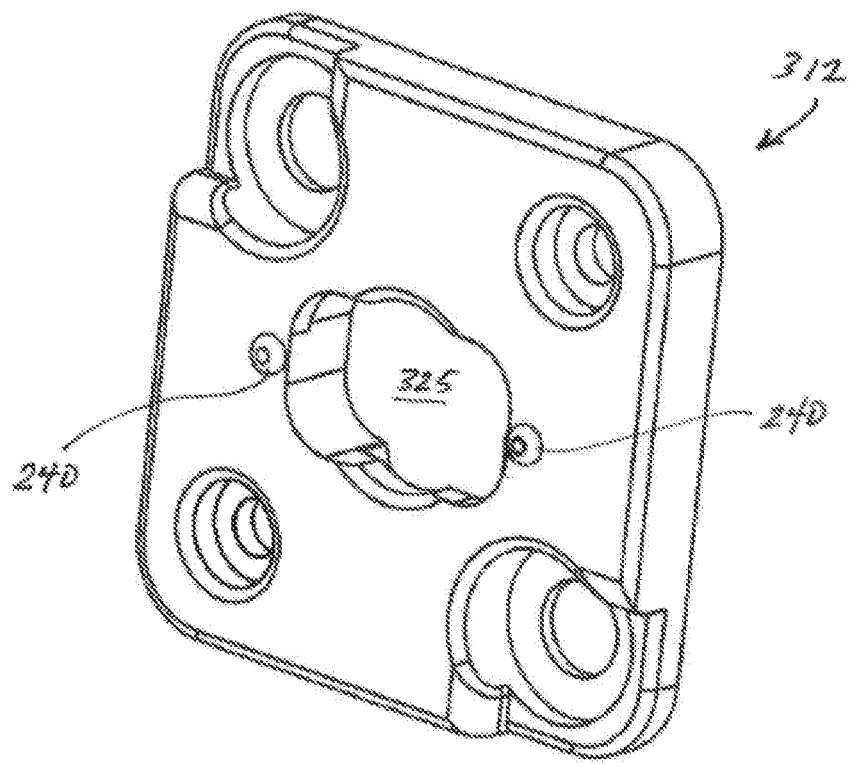
FIG. 20 is a perspective view of a main fastener in accordance with one embodiment.
Figure 21:
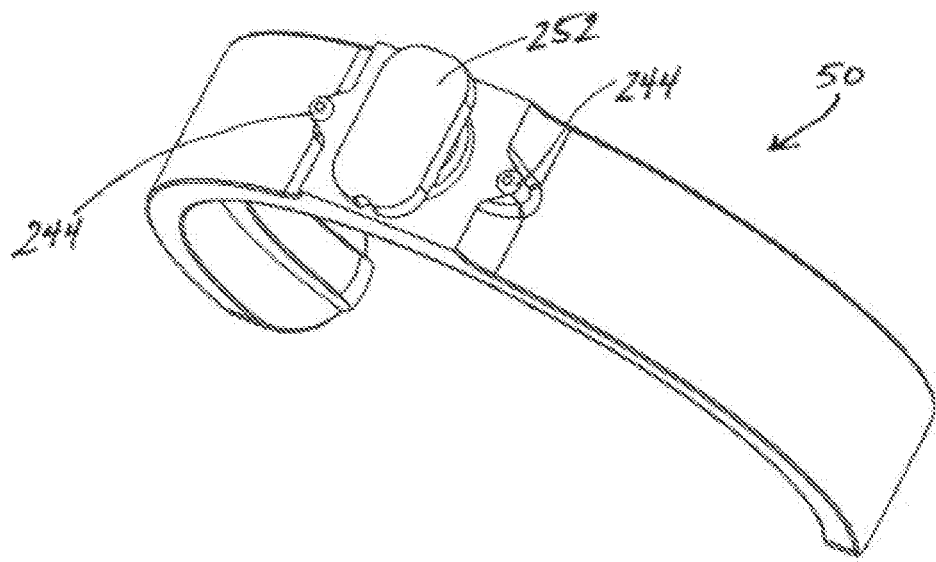
FIG. 21 is a perspective view of an attachment member in accordance with one embodiment.
Figure 22:
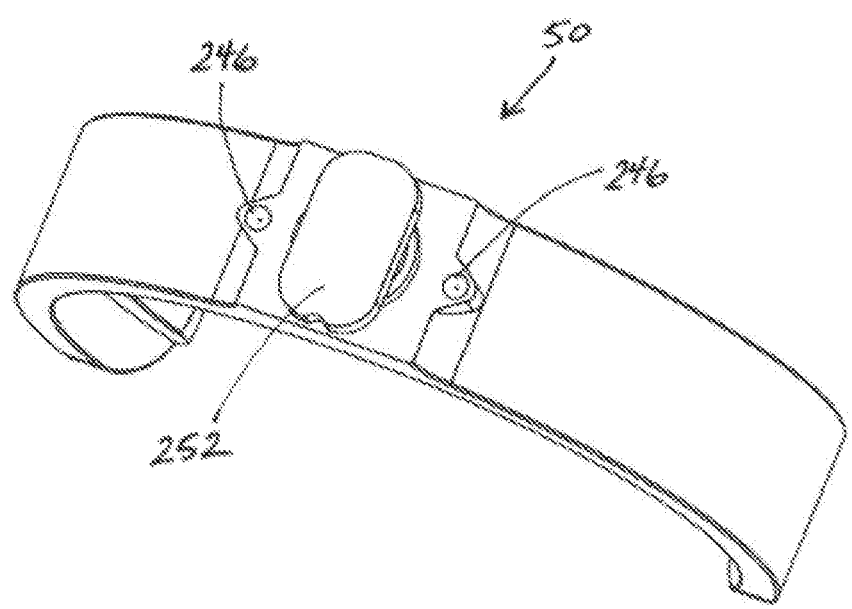
FIG. 22 is a perspective view of an attachment member in accordance with one embodiment.

With reference to FIG. 17, the interchangeable fastener system 10 may be disassembled and the individual parts, including the main fastener 12, 212 and at least one attachment member 50 may be stowed in container 300.

Referring to FIGS. 18-22, the main fastener 312 and attachment member 50 may include corresponding male detents 240, 244 and female detents 242, 246 for releasably locking the attachment member 50 into place on the main fastener 312. In operation, the elongate member 52 of the attachment member 50 is selectively passed through the channel 325 from the front surface through the rear surface and then selectively rotated until the corresponding male detents 240, 244 and female detents 242, 246 are mated. The corresponding male detents 240, 244 and female detents 242, 246 are sized and configured such that moderate rotational force applied by a user will be sufficient to un-mate the corresponding male detents 240, 244 and female detents 242, 246 when separating the attachment member 50 from the main fastener 12.

While the present invention has been shown and described in accordance with several preferred and practical embodiments, it is recognized that departures from the instant disclosure are contemplated within the spirit and scope of the present invention.

What is claimed is:

1. An interchangeable fastener system for use in combination with a perforated board having a plurality of openings thereon, the interchangeable fastener system comprising:
   a main fastener including a base having a rear surface and a front surface;
   a plurality of protrusions extending from the rear surface of the base, and each of the plurality of protrusions being sized and configured for engaged passage through a corresponding one of the plurality of openings on the perforated board for supporting the main fastener on the perforated board;
   each of the plurality of protrusions being located on a corresponding perimeter zone of the base, wherein each of the perimeter zones defines a tab;
   a plurality of slots formed on the base for facilitating selectively breaking off the corresponding tab;
   the base surrounding a channel defined by an inner surface extending between open ends at the rear and front surfaces of the base, the inner surface including opposing ramp surfaces to facilitate tightening of an attachment member, a mechanical stop adjacent each ramp surface to prevent over rotation of the attachment member, and a latching protrusion sized and configured for preventing inadvertent removal of the attachment member, and wherein the latching protrusion may be selectively depressed to permit removal of the attachment member;
   the attachment member including an elongate member having opposing ends, wherein the elongate member is sized and configured for selective passage through the channel from the front surface through the rear surface and wherein the attachment member may be selectively rotated so that opposing ends of the elongate member are each in engaged abutment against a corresponding one of the opposing ramp surfaces and mechanical stops; and
   a cylindrical bore formed on the base, the cylindrical bore being sized and configured for centering the attachment member within the channel.

2. The interchangeable fastener system as recited in claim 1 further comprising at least one counterbore relief formed on the base, the at least one counterbore relief being sized and configured to facilitate mounting the main fastener.

3. The interchangeable fastener system as recited in claim 1 wherein the opposing ramp surfaces have opposite angles of incline.

4. The interchangeable fastener system as recited in claim 1 wherein the attachment member is a clamp member sized and configured for engaged receipt of a container.

5. The interchangeable fastener system as recited in claim 1 wherein the attachment member is a spring clamp member.

6. The interchangeable fastener system as recited in claim 1 wherein the attachment member is a loop member.

7. The interchangeable fastener system as recited in claim 1 wherein the attachment member is a quadrilateral member.

8. The interchangeable fastener system as recited in claim 1 wherein the attachment member is a magnetic member.

9. The interchangeable fastener system as recited in claim 1 wherein the attachment member is a spool holder member.

10. An interchangeable fastener system for use in combination with a perforated board having a plurality of openings thereon, the interchangeable fastener system comprising:
    a main fastener including a base having a rear surface and a front surface;
    a plurality of counterbored holes formed on the base, each of the plurality of counterbored holes being relieved for engaged receipt of a corresponding one of a plurality of push grommets, and each of the plurality of grommets being sized and configured for engaged passage through a corresponding one of the plurality of openings on the perforated board for supporting the main fastener on the perforated board;
    the base surrounding a channel defined by an inner surface extending between open ends at the rear and front surfaces of the base, the inner surface including opposing ramp surfaces to facilitate tightening of an attachment member, and a mechanical stop adjacent each ramp surface to prevent over rotation of the attachment member;
    the attachment member including an elongate member having opposing ends, wherein the elongate member is sized and configured for selective passage through the channel from the front surface through the rear surface and wherein the attachment member may be selectively rotated so that opposing ends of the elongate member are each in engaged abutment against a corresponding one of the opposing ramp surfaces and mechanical stops; and a cylindrical bore formed on the base, the cylindrical bore being sized and configured for centering the attachment member within the channel.

11. The interchangeable fastener system as recited in claim 10 further comprising at least one counterbore relief formed on the base, the at least one counterbore relief being sized and configured to facilitate mounting the main fastener.

12. The interchangeable fastener system as recited in claim 10 wherein the opposing ramp surfaces have opposite angles of incline.

13. The interchangeable fastener system as recited in claim 10 wherein the attachment member is a clamp member sized and configured for engaged receipt of a container.

14. The interchangeable fastener system as recited in claim 10 wherein the attachment member is a spring clamp member.

15. The interchangeable fastener system as recited in claim 10 wherein the attachment member is a loop member.

16. The interchangeable fastener system as recited in claim 10 wherein the attachment member is a quadrilateral member.

17. The interchangeable fastener system as recited in claim 10 wherein the attachment member is a magnetic member.

18. The interchangeable fastener system as recited in claim 10 wherein the attachment member is a spool holder member.

19. An interchangeable fastener system for use in combination with a perforated board having a plurality of openings thereon, the interchangeable fastener system comprising:

a main fastener including a base having a rear surface and a front surface;

a plurality of counterbored holes formed on the base, each of the plurality of counterbored holes being relieved for engaged receipt of a corresponding one of a plurality of push grommets, and each of the plurality of grommets being sized and configured for engaged passage through a corresponding one of the plurality of openings on the perforated board for supporting the main fastener on the perforated board;

the base surrounding a channel defined by an inner surface extending between open ends at the rear and front surfaces of the base, the inner surface including opposing ramp surfaces to facilitate tightening of an attachment member;

the attachment member including an elongate member having opposing ends, wherein the elongate member is sized and configured for selective passage through the channel from the front surface through the rear surface and wherein the attachment member may be selectively rotated until a male detent mates with a female detent for securing the attachment member to the main fastener; and a cylindrical bore formed on the base, the cylindrical bore being sized and configured for centering the attachment member within the channel.

20. The interchangeable fastener system as recited in claim 19 further comprising a mechanical stop adjacent each ramp surface to prevent over rotation of the attachment member.

* * * * *